United States Patent [19]
Schofield

[11] 3,977,832
[45] Aug. 31, 1976

[54] SYSTEM FOR CONTROL OF A NITRIC ACID PLANT

[75] Inventor: William R. Schofield, Allentown, Pa.

[73] Assignee: Air Products and Chemicals, Inc., Allentown, Pa.

[22] Filed: Jan. 20, 1975

[21] Appl. No.: 542,610

[52] U.S. Cl. ............... 23/260; 23/255 E; 23/262; 423/392
[51] Int. Cl.² ............ B01J 8/02; B01J 8/04; C01B 21/40
[58] Field of Search ........... 423/392; 23/260, 262, 23/255 E, 255 R, 253 A, 230 A

[56] References Cited
UNITED STATES PATENTS

| | | | |
|---|---|---|---|
| 2,697,652 | 12/1954 | Ribble et al. ................. | 23/260 |
| 2,955,917 | 10/1960 | Roberts et al. ................ | 423/392 |
| 3,715,887 | 2/1973 | Weatherly et al. ............ | 60/650 |

Primary Examiner—Joseph Scovronek
Attorney, Agent, or Firm—Richard A. Dannells, Jr.; H. Barry Moyerman

[57] ABSTRACT

In the operation of a nitric acid plant, the rate of flow of process air to the converter in which ammonia is oxidized is controlled by injection of steam at regulated rates into the heated tail gas from the nitric acid production, thereby utilizing regulated mass flow power augmentation in the gas used for powering the expansion turbines employed in driving the compressors operated to furnish required process air at superatmospheric pressure to the nitric acid plant.

2 Claims, 2 Drawing Figures

SYSTEM FOR CONTROL OF A NITRIC ACID PLANT

BACKGROUND OF THE INVENTION

In the conventional commercial process for the manufacture of nitric acid ammonia is oxidized by contact with air at elevated temperature over noble metal catalyst to form initially nitrogen oxide, which in the presence of excess oxygen is further oxidized to nitrogen dioxide or its dimer. The $(NO_2)_x$ is absorbed in water to produce nitric acid as illustrated by the equation:

$$3\ NO_2 + H_2O \rightarrow 2\ HNO_3 + NO \qquad (A)$$

The nitrogen oxide thus released is reoxidized to $NO_2$ by contact with so called "bleach" air introduced into the absorber.

In the modern practice such plants are operated at superatmospheric pressure of seven atmospheres or higher to take advantage of increased oxidation rate of NO to $NO_2$. The history of the development of the pressure process thus far described and the reaction mechanisms involved as well as certain of the calculations entering into the design of plants of this kind are reviewed in a monograph by T. H. Chilton, entitled "The Manufacture of Nitric Acid by the Oxidation of Ammonia"; *Chemical Engineering Progress Monograph Series*, No. 3, Vol. 56 (1969).

Since the several progresive reactions involved in the conversion of $NH_3$ to $HNO_3$ are exothermic the energy thus liberated is utilized to supply at least part of the power for compressing the air to the desired operating pressure. In a conventional commercial system, the tail gas from the absorber is reheated to the required temperature for operation of the expansion turbine system furnishing power for driving the air compressors.

With the application of stricter standards on fume abatement and to protect the turbine blades from corrosion by the tail gas, it has been the practice to purify the gas prior to introducing the same into the turbines or discharging to the atmosphere. This can be accomplished by passing the preheated tail gas over a noble metal catalyst in the presence of a reductant, such as a hydrocarbn fuel, which reduces the $NO_x$ in the tail gas to innocuous elemental nitrogen while residual oxygen in the gas stream is consumed by combustion of the hydrocarbons to form $CO_2$ and water. Since additional sensible heat is thus released in the $NO_x$ abatement unit, the additional energy thus made available is beneficially utilized in supplying power for operation of the gas expansion turbines.

Although a substantial part of the thermal energy of the gas employed in driving the expansion turbine system is derived from exothermic process heat released in the oxidation of ammonia to nitic acid and that released in the catalytic $NO_x$ abatement unit, this heat content is generally insufficient in itself to meet the net power requirements of the turbine system in modern plants operating at superatmospheric pressure. Additional heat is generally supplied by direct heating of the tail gas in a burner to which external fuel is supplied together with air to support combustion. Such heating of the tail gas, moreover, raises the temperature thereof to an efficient level for promoting the catalytic reduction of the residual $NO_x$ in the abatement unit.

As seen from the foregoing description, the air compressors driven by the expansion turbines supply air at superatmospheric pressure utilized in the nitric acid plant. The stream of compressed air thus supplied may be divided into three individual branch streams, providing (1) reactant air furnishing oxygen for initial reaction with ammonia in the converter, (2) bleach air for oxidation of NO in the absorber, and (3) air utilized to support combustion in the direct fired heater.

To obtain the desired high nitric acid production rates at maximum efficiency, it is important not only that the flow of air and ammonia to the converter for the initial oxidation reaction be regulated but also that controls be maintained on the total air supplied to the system by the compressors. Even though a plant may have been initially designed for appropriate flow rates and system power balance, unintended variations in air flow which may result from changes in pressure and/or temperature of the incoming air supplied to the compressors, or intentional changes in production schedules will necessitate adjustment of the several components of the system to satisfy the new conditions imposed. Because of the interdependent relationships of the various components of the system, it will be appreciated that even small changes in any one of these, unless properly compensated, will throw the whole system out of balance and may "snowball" the effect of such change with consequent deleterious influence on the efficiency and economics of the plant operation.

Various concepts have been suggested or attempted for monitoring and controlling nitric acid plant operation, none of which have been found fully satisfactory to obtain the desired objectives. In modern plants a constant ratio of air to ammonia introduced into the oxidation converter is automatically maintained by provision of ratio set stations responsive to measured variations in air flow rate. To maintain the designed production rate, however, the flow of air to the ammonia converter must also be set and maintained substantially constant despite possible variation in the flow rate of air discharged by the compressor system. In preliminary studies leading to the present invention, it was found that in attempting to manipulate the firing rate in the direct fired heater to provide a controlled steady supply of air at the compressor outlet, there was a massive thermal inertial lag between the point at which the firing rate was changed and the point at which the effect of such change is ultimately felt.

BRIEF STATEMENT OF THE INVENTION

Among the objects of the present inention, therefore, is to provide an efficient and reliable control system for operation of nitric acid plants, which can be readily adapted for automatic operation.

In principle, the novel control system of the present invention entails a mass flow power augmentation method as opposed to a heat supply method of operational control, thus avoiding the thermal inertia lag characteristic of the latter method.

Succinctly stated, in accordance with the present invention, the rate of flow of process air to the ammonia converter is controlled by regulated injection of steam into the direct fired heater, while the firing rate in that heater is controlled to maintain a preset temperature for the gas mixture discharged from the heater. The rate of supply of hydrocarbon fuel to the $NO_x$ abatement combuster unit is maintained by suitable controls at a set ratio to the gas flow rate of absorber tail gas into the direct fired heater.

The operation of the invention will be fully understood and its several advantages appreciated from the

DETAILED DESCRIPTION OF THE PROCESS

Figure 1:
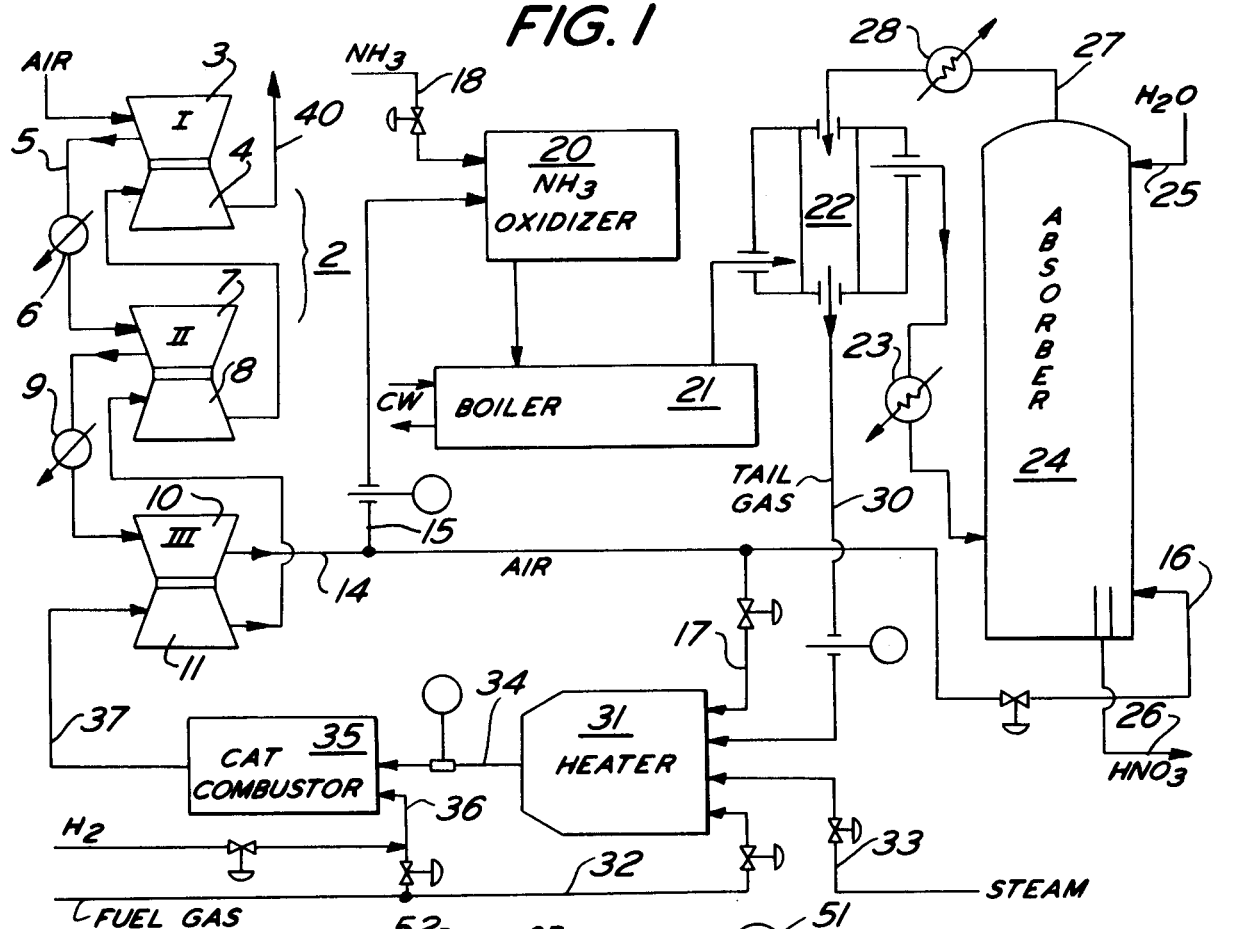
FIG. 1 is a schematic process flow diagram of a nitric acid plant to which the novel control system of the present invention may be applied.

As shown in FIG. 1, an air stream at ambient conditions is admitted to a three stage compressor system, generally designated 2, comprising compressor units mechanically coupled to be driven by associated gas expansion turbine units. The compressor system illustrated comprises in the first stage a compressor 3 coupled to and driven by a turbine 4. The air thus compressed is discharged through line 5, passed through interstage cooler 6 into second stage compressor 7 in which it is further raised in pressure. Compressor 7 is coupled to and driven by expansion gas turbine 8. The compressed gas discharged from 7 passes through interstage cooler 9 into final stage compressor 10, driven by gas turbine 11. From the last stage of compression at 10, the process air stream 14 is discharged at the design pressure, usually in the range of about 7 to 10 atmosphere absolute.

While in the embodiment described and illustrated, a three stage compressor-expander-system is referred to, it will be understood that the invention is in no way limited to such system, and is equally applicable to systems having a greater or lesser number of compression stages. Moreover, any compression stage may comprise two or more compressor - expander units operating in parallel. Such a system for use in a nitric acid plant is described in Weatherly et al U.S. Pat. No. 3,715,887 which may be used in practice of the present invention. Although the process gas usually employed in nitric acid plants is atmosphere air, it will be understood that the air supply may be enriched with supplemental oxygen supplied from an external source, and the novel control system of the invention is equally applicable thereto.

Air stream 14, as illustrated, is subdivided into several branch streams designated 15, 16, and 17, respectively. Stream 15 furnishes the air used in oxidation of ammonia. Thus, stream 15 is admixed with ammonia introduced by line 18 into catalytic converter 20, in which the initial oxidation takes place over known noble metal catalyst, forming oxides of nitrogen, chiefly NO. The gas stream of reaction products from converter 20 is passed through a waste heat boiler 21 in which the stream is initially cooled, and then through a heat exchanger 22 and cooling condensor 23, for further lowering of the temperature prior to admission of the thus cooled gas stream in absorber tower 24.

Water is admitted to absorber 24 by a supply line 25. As the NO-containing gas stream is successively cooled at 21, 22 and 23 in the presence of excess oxygen, at least the major portion of the NO is converted to $NO_2$, in accordance with the equation $$2NO + O_2 \rightleftarrows 2NO_2 \qquad (B)$$

By the absorption of the $NO_2$ in water in absorber 24, nitric acid ($HNO_3$) is formed as illustrated by equation (A) above with release of NO as by product in the absorber. So called "bleach air" is charged to the bottom of absorber 24, by line 16, which effcts oxidation of NO to $NO_2$, which in turn is reactively absorbed in the water to form additional nitric acid. The aqueous nitric acid solution is discharged from absorber 24 by line 26, while the unabsorbed tail gas is discharged overhead by line 27.

The discharged tail gas passes through a preheater 28 for indirect heat exchange with steam and then further raised in temperature in exchanger 22 by hot product gas from 20 and 21. The tail gas thus pre-heated passed by line 30 to a direct fired heater 31, for further temperature elevation. Fuel for heater 31 is furnished by a line 23, while the oxygen needed for combustion thereof is supplied to the heater by line 17. To increase available energy in the products of combustion from heater 31, steam may be injected by line 33.

The total effluent from heater 31, in addition to the added steam and products of fuel combustion, will contain oxides of nitrogen ($NO_x$) which are deleterious both from the standpoint of their effect on the turbine parts as well as their pollution on discharge to the atmosphere. It is therefore common practice to convert these nitrogen oxides to innocuous gas by reduction to elemental nitrogen. Such reductions of $NO_x$ in the gas stream discharged from 31 is carried out by catalytic combustion in a $NO_x$ abatement unit 35, wherein the gas is treated with a suitable reductant, such as natural gas or other hydrocarbon fuel, admitted thereto by line 36. If available and so desired, the reductant hydrocarbon fuel admitted to abatement unit 35, may be supplemented with hydrogen-containing off gas. Abatement unit 35 contains noble metal or other suitable catalyst promoting the desired reduction of $NO_x$. In unit 35 also, remaining oxygen in the gas stream from heater 31 is consumed in combustion of the hydrocarbons and any free hydrogen to $CO_2$ and water. As a result of the several reactions taking place in unit 35 the temperature of the gas is further increased, and is then discharged through line 37 into the expansion gas turbine 11 driving the third stage air compressor 10 of system 2. The discharge gas from turbine 11 passes successively through turbines 8 and 4, and is finally discharged to stack through line 40.

The system thus far described is of a type which is for the most part in commercial nitric acid plants. The novel monitoring and control features subject of the present invention, will now be described as applied to a plant of the type illustrated.

Figure 2:
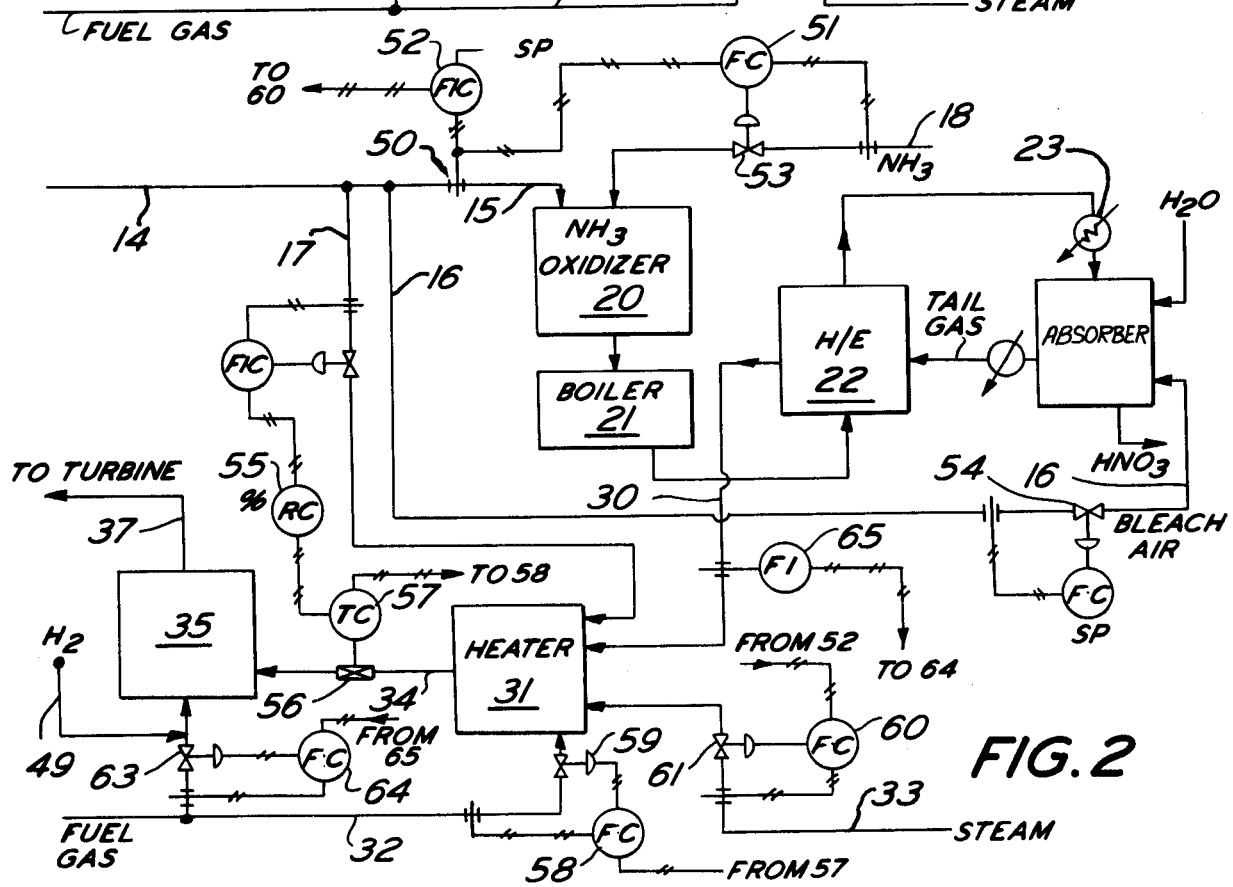
FIG. 2 is a further simplified flow diagram illustrating the control stations and their interrelation utilizing the novel system of the present invention.

The interrelation of the several control stations of the novel system of the invention will be understood from the simplified process flow diagram of FIG. 2. Like parts are numbered similarly to those in FIG. 1.

The compressed gas from the third stage of compression is divided into three branch streams as heretofore described, one (17) going to the direct fired heater, one (16) to the absorber for use as bleach gas and the third (15) going to the oxidation of ammonia. The rate of flow of air in line 15 is measured by any known suitable means indicated at 50, and the flow rate of ammonia to be admixed therewith is proportionately set to maintain the desired constant ratio of ammonia/air under control of flow controller 51 in ammonia line 18. Thus any change in the flow rate of air in line 15 detected at 50 is signalled to flow controller 51, which is designed to adjust the position of valve 53 in the ammonia supply line, thereby to maintain the set fixed ratio of ammonia to air entering convertor 20.

The air flow rate in line 14 is determined by the operation of the compressor system under the influence of the energy input to the gas turbine system driving these compressors. Variations in the temperature and/or the mass flow rate of the driving gas supplied to the turbine system by line 37 will effect corresponding changes in the flow rate of air in line 14. The quantity of air employed as bleach air is set at a constant rate at valve 54 in line 16. The supply of combustion air through line 17 is maintained at a fixed predetermined ratio for combustion of the gaseous fuel supplied to heater 31 through line 32, under control of ratio setting device at 55. A temperature sensing element 56 in line 34 carrying combustion products from heater 31 to catalytic combustion unit 35, signals controller 57 and through a cascade hookup energizes flow control device 58 to actuate the valve 59 in fuel line 32 in a direction to increase or decrease the fuel supplied to heater 31 as required to maintain the temperature set at 56.

Since the amount of air withdrawn by line 17 for combustion is only a small fraction of the total air supplied by line 14 (generally less than 5%), the slight deviations in air flow in line 17 to satisfy that needed for combustion of the fuel supplied to maintain the desired temperature set at 56, will have no important effect on the air flow measured at 50. Accordingly, the flow rate of air in line 15 can be controlled by the mass flow rate of steam admitted to heater 31 through line 33. Any deviations from the air flow rate set at flow controller 52, as measured at 50, are transmitted through a cascade hookup to flow controller 60, which in turn operates valve 61 to supply steam at the rate required to restore the air flow rate at 50 to the preset design value, since the amount of steam thus supplied controllably determines the enthalpy of the gas and thus the energy input to the turbines by line 37.

In heater 31, the tail gas in line 30 may be raised some 200°–300°F (~110°–165°C) above that at which such gas enters the heater. Further increase in the temperature of the gas to that desired to power the gas turbines, is had in the catalytic combustor 35. The quantity of fuel supplied to combustor 35 is controlled by valve 63 under influence of flow controller 64, and is dependent upon the flow rate of tail gas to heater 31. Thus, the flow rate measured in the line 30 is signalled through appropriate hookup from flow indicator 65 to flow controller 64, thereby actuating valve 63 to supply an amount of reductant fuel gas proportional to the tail gas supply. In combustor 35 not only are NO and $NO_2$ reduced to elementary nitrogen but residual free oxygen in the tail gas is also consumed by burning of the hydrocarbon to carbon dioxide and water. In installations in which a hydrogen-containing off gas is used to supplement part of the hydrocarbon fuel supplied to combustor 35, appropriate control devices will be provided in line 49, to maintain the desired ratio of off-gas to hydrocarbon fuel.

A typical commercial nitric acid plant requires approximately in the order of 9300–9400 s.c.f.m. of process air at a pressure above 120 psig and at a temperature of about 270°–290°F for each 100 tons/day of nitric acid produced (i.e. ~ 361 to 366 liters/hr air at above 9 atmospheres absolute pressure at about 132°–143°C for each 90.7 metric tons of nitric acid). The resulting tail gas will comprise about 34000 pounds/hr (74,958 kg/hr) at about 7.5 atmospheres. For operation of the high temperature high pressure expansion turbine driving the third or final stage compressor, the tail gas is brought to a temperature of about 1200 ± 50°C (620°–675°C).

While the foregoing description is concerned with control of a chemical process system for manufacture of nitric acid, it will be understood that the principle of the invention is applicable to any chemical manufacture system employing compressed air as a process gas and having a significant amount of tail gas which is or can be brought to a temperature and enthalpy sufficient to provide at least a substantial part of the energy for powering gas expansion turbines for driving the air compressors.

In a system such as a nitric acid plant of the type described, sufficient steam will be available for injection into heater 31, by recovery of exothermic heat from the ammonia oxidation reaction, for example that collected from waste heat boiler 21. In studies conducted in a dynamic model of the described system it was found that a steady steam injection rate into the heater of about 150 lbs/min was required to obtain a turbine inlet gas temperature of 1150°F (621°C) and that for 1206°F (652°C) turbine inlet temperature the steady steam injection rate was 102 lbs/min (46.27 kg/min). Plotting of experimental data over the temperature range revealed the general guide rule that approximately 5% steam by weight of tail gas entering the heater is required for a turbine gas inlet temperature of about 1200°F (~ 649°C). Lesser amounts of steam can be employed at higher discharge temperature from heater 31 but at the expense of increased fuel costs.

Data from the dynamic model studies further revealed that, in runs in which it was attempted to control the process air flow rate at the design level by manipulation of the firing rate in the direct fired heater by varying the rate of fuel supplied thereto, as the firing rate was increased in attempt to provide an increased supply of air to the ammonia convertor, there was a larger amount of air diverted to the direct fired heater to support combustion of the higher fuel supply thereto, thus initially causing an undesired opposite effect to that desired, in temporarily lowering the rate of air supplied to the ammonia convertor, evidenced by a dip of the process air supply rate below its starting rate. It was only after about two minutes elapsed that the effect of the increased firing rate in the direct fired heater was felt in the process air rate through increased turbine power input. In all cases at least 8 to 10 minutes was required to reach design flow. Several times this period would be required to reach steady state conditions even if no additional upset were to occur.

In runs in which the novel arrangement of the present invention was used, wherein steam injection was employed to control process air flow rate, the effect of the control system was almost immediate without the dip or lag earlier experienced, even under more severe tests in which the controls were put into operation at the start. Design flow was reached in approximately one minute with a fast controller setting, and stabilization at near the design rate in two to three minutes.

What is claimed is:

1. In a system for operating a chemical plant utilizing compressed process gas wherein the energy for compressing said gas is furnished at least in part by the augmented enthalpy of a waste gas derived from such chemical plant, said system including: gas compressor means driven by gas expansion turbine means, first conduit means for conducting compressed air to a chemical processing unit, second conduit means for conveying the discharged waste gas from said chemical processing unit to said gas expansion turbine means, and means in the path of said second conduit means in advance of said turbine to raise the temperature and augment the enthalpy of said tail gas; the improved arrangement for monitoring and controlling the flow rate of the compressed process gas supplied to said chemical processing unit, said arrangement comprising:

a. a heater provided with an inlet for waste gas discharged from said chemical processing unit and a discharge conduit for heated effluent gas;
   b. a fuel gas supply line for introducing combustible fuel into said heater;
   c. an air supply line for introducing air for supporting combustion in said heater;
   d. flow control means in (b),
   e. flow control means in (c),
   f. a temperature sensing means in the discharge conduit of said heater; said sensing means being operatively connected to temperature control means responsive thereto; said temperature controls means being effective in manipulating the flow control means (d) to maintain a substantially constant temperature at (f);
   g. ratio control means operatively associated with said temperature control means of (f) and said flow control means (e), to maintain a preset constant ratio of air to fuel supplied to said heater;
   h. a steam supply line communicating with said heater for injection of steam therein;
   i. flow control means on said steam supply line;
   j. flow rate measuring means in the said first conduit conducting compressed air to said chemical processing unit; and
   k. means for signal communication between said flow measuring means (j) and said flow control means (i), whereby said control means (i) is responsive to variations in air flow rate measured at (j) to supply controlled quantities of steam to the heater to augment the enthalpy of the gas powering said turbine means, to the extent required to compensate deviation and to maintain the air flow rate to the chemical processing unit substantially constant.

2. A nitric acid plant involving oxidation of ammonia vapor by oxygen-containing gas at superatmospheric pressure; said plant having an ammonia oxidation convertor and an absorber for absorption of produced oxides of nitrogen in liquid aqueous media, said absorber being provided with conduit means for discharge of unabsorbed tail gas; said plant being further provided with compressor means for compressing said oxygen-containing gas for introduction into said converter, gas expansion turbines operatively connected to said compressor means for driving the latter and means for heating the tail gas discharged from said absorber; an inlet conduit for introduction of tail gas into said heater, a conduit for introduction of fuel gas into said heater, a conduit for introduction of combustion supporting gas into said heater and a steam line for injection of steam into said heater; a discharge line for conveying heated gas from said heater to a catalytic combustion unit downstream of said heater; said catalytic combustion unit being provided with a conduit for introduction of reducing gas thereinto for reduction of residual oxides of nitrogen to elemental gas, means for conducting hot gas from said catalytic combustion unit to said expansion turbines, and a control system comprising:

a flow rate indicator measuring the rate of flow of oxygen-containing gas into said converter, a flow controller on said steam line responsive to deviations in gas flow rate from the value preset at said indicator; a temperature sensor in the line from said heater to said catalytic combustion unit, a temperature control device operatively connected to said temperature sensor; flow control means in said fuel introduction conduit responsive to said temperature control device adapted to maintain a substantially constant temperature in the gas stream monitored by said temperature sensing device; flow control means in said conduit supplying combustion supporting gas to said heater, said flow control means being responsive to a ratio control means to maintain a preset ratio of combustion supporting gas to fuel introduced into said heater; a flow measuring device on the inlet conduit conveying tail gas to said heater, and a flow control device in said conduit for introduction of reducing gas into said catalytic combustion unit, said last named flow control device being responsive to the measured tail gas flow rate entering said heater to maintain a preset ratio of reducing gas admitted to the catalytic combusion unit to the flow rate of tail gas entering said heater.

* * * * *